United States Patent
Fukunaga et al.

(10) Patent No.: US 6,595,255 B1
(45) Date of Patent: Jul. 22, 2003

(54) PNEUMATIC TIRE INCLUDING THREE CIRCUMFERENTIAL GROOVES

(75) Inventors: Takayuki Fukunaga, Tokyo (JP); Jun Matsuzaki, Tokyo (JP); Makoto Ishiyama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/684,832

(22) Filed: Oct. 10, 2000

(30) Foreign Application Priority Data

Oct. 25, 1999 (JP) .......................... 11-302754

(51) Int. Cl.$^7$ .................. B60C 11/11; B60C 111/00; B60C 115/00
(52) U.S. Cl. ................. 152/209.8; 152/209.28
(58) Field of Search .................. 152/209.8, 209.9, 152/209.28, 904; D12/517, 527, 528, 559, 560, 561

(56) References Cited

U.S. PATENT DOCUMENTS

| | | | |
|---|---|---|---|
| 4,456,046 A | * | 6/1984 | Miller |
| 4,884,607 A | * | 12/1989 | Mori |
| 4,913,208 A | * | 4/1990 | Anderson et al. |
| 4,984,616 A | * | 1/1991 | Shepler et al. |
| 5,291,929 A | * | 3/1994 | Daisho et al. |
| 5,327,952 A | * | 7/1994 | Glover et al. |
| 5,329,980 A | * | 7/1994 | Swift et al. |
| 5,421,391 A | * | 6/1995 | Himuro |
| 5,425,406 A | * | 6/1995 | Swift et al. |
| 5,603,785 A | * | 2/1997 | Weber et al. |
| D388,753 S | * | 1/1998 | Brayer et al. |
| D405,732 S | * | 2/1999 | Johenning et al. |
| 5,954,107 A | * | 9/1999 | Kuze et al. |
| 5,967,210 A | * | 10/1999 | Himuro |

FOREIGN PATENT DOCUMENTS

| | | |
|---|---|---|
| EP | 0 296 605 A2 | 12/1988 |
| EP | 0 346 781 A2 | 12/1989 |
| EP | 0479 761 A2 | 4/1992 |
| EP | 812708 | * 12/1997 |
| JP | 2-212202 | * 8/1990 |
| JP | 4-215504 | * 8/1992 |
| JP | 7-215013 | * 8/1995 |

* cited by examiner

*Primary Examiner*—Steven D. Maki
(74) *Attorney, Agent, or Firm*—Sughrue Mion, PLLC

(57) ABSTRACT

In a pneumatic tire of the present invention, a pair of circumferential main grooves with a tire equatorial plane interposed therebetween, and another pair of circumferential main grooves at a tire axial direction outer side and inner side of the former pair of circumferential main grooves, are provided in a central area of a tread. A groove width center line of the circumferential main grooves at the tire axial direction outermost side and innermost side is disposed at a position 30% to 40% of a ground contact half width distanced from the tire equatorial plane. Further, outboard side slanted longitudinal main grooves, and slanted lateral main grooves having ends which open into at least one of the circumferential main grooves and other ends which open into contact ground end in the vehicle width direction, are disposed on the tread. Accordingly, irregular wear of land portions can be suppressed, controlling stability can be improved, and water at the ground contact surface can be efficiently drained from the ground contact surface with less drag from the water, even if the tread width of the tire is wide. In short, a pneumatic tire is provided in which high wet condition drainage performance, controlling stability and tire wear resistance can be altogether improved.

16 Claims, 2 Drawing Sheets

PNEUMATIC TIRE INCLUDING THREE CIRCUMFERENTIAL GROOVES

BACKGROUND OF THE INVENTION

1. Field of the Invention

The present invention relates to a pneumatic tire, and more particularly, to a pneumatic tire suitable for a high performance vehicle in which high wet-condition drainage performance, controlling stability and tire wear resistance can be improved without sacrificing other tire properties.

2. Description of the Related Art

Conventionally, in order to suppress the occurrence of hydroplaning in a tire having a wide tread width, such as rear tires on super high-performance vehicles for racing competitions, methods have been employed which set a plurality of straight, main grooves in a central region of the tire, or which increase the negative ratio.

However, problems such as grip deterioration and deterioration in tire wear resistance arise because the area of land portions in the central region of the tire and also block width decrease.

SUMMARY OF THE INVENTION

Taking these facts into consideration, an object of the present invention is to provide a pneumatic tire suitable for a high performance vehicle, in which high wet-condition drainage performance, controlling stability, and tire wear resistance can be improved without sacrificing other tire properties. A first aspect of the present invention is a pneumatic tire for mounting to a wheel and supporting a vehicle above a surface, the tire comprising a tread having opposite edges and a surface contacting portion, and an equatorial centerline plane, the tread including: (a) at least three circumferential main grooves extending through a central area in the surface contacting portion, the central area being located within 45% of one-half of a width of the surface contacting portion from the equatorial centerline plane along an axial direction of the tire towards the edges of the tread, each circumferential main groove having a groove width from 6% to 10% of one-half of said width of the surface contacting portion, with groove center lines of two tire-axial-direction outermost circumferential main grooves being located distanced from 30% to 40% of one-half of said width from the equatorial centerline plane towards each of the edges of the tread; (b) a plurality of slanted lateral main grooves, each having opposite ends, one end of each slanted lateral main groove opening into a circumferential main groove and the other end of each slanted lateral main groove opening into one of the edges of the tread, each slanted lateral main groove slanting such that said one end thereof is positioned further along a direction of rotation of the tire relative to said other end of that slanted lateral main groove when the tire is rolling forwardly as used on a vehicle, each slanted lateral main groove having a groove width in a range of 8 mm to 11 mm, a tire circumferential direction spacing from one another in a range of 45 mm to 52 mm, an angle with respect to the tire circumferential direction, between two tire-axial-direction outermost circumferential main grooves, being within a range of 20° to 60°, and an angle with respect to the tire circumferential direction, outside the two tire-axial-direction outermost circumferential main grooves, being within a range of 45° to 90°; and (c) a plurality of land portions defined by the adjacent circumferential main grooves, with some land portions nearer to the equatorial centerline plane than any of the other land portions, said some land portions having a tire axial direction width of 6% to 10% of the surface contact width.

Generally, when a tire having a wide tread width (e.g., a tread width of 250 mm or greater), such as rear tires on super high-performance vehicles for racing competitions, is run at a high speed on a wet road surface, water on the road surface is drained in the direction that the tire advances, at a region extending in the outboard side direction from the inboard side tread edge to a position approximately 45% of a ground contact half width distanced from a tire equatorial plane.

In such a case as this, a pneumatic tire according to the present aspect achieves the following excellent effects.

Firstly, according to a pneumatic tire of the present aspect, as at least three circumferential main grooves extending along the tire circumferential direction are provided in a central area extending in the outboard/inboard direction from a tire equatorial plane to a position 45% of a ground contact half width distanced from the tire equatorial plane, drainage from the central region of the tire can be achieved efficiently.

Further, because each circumferential main groove has a groove width from 6% to 10% of one-half of said width of the surface contacting portion, and groove center lines of two tire-axial-direction outermost circumferential main grooves are located distanced from 30% to 40% of one-half of said width from the equatorial centerline plane towards each of the edges of the tread, drainage from the tire central area becomes most efficient.

The number of circumferential main grooves provided in the central area is preferably four.

When the tire axial direction width of land portions nearest the tire equatorial plane is less than 6% of the ground contact width, the width of the land portions becomes too narrow, and wear resistance and controlling stability deteriorates.

On the other hand, when the width of the same land portions exceeds 10% of the ground contact width, problems such as impairment of ground contact properties during acceleration, and insufficient traction and unstable behavior at the time cornering is initiated are generated.

When the tire axial direction width of the same land portions is less than 6% of the ground contact width, drainage performance drops and performance in wet conditions declines. When the tire axial direction width of land portions exceeds 10% of the ground contact width, land portion areas decrease and resistance to tire wear and controlling stability deteriorate.

When the groove width of the slanted lateral main grooves is less than 8 mm, drainage performance declines, and when the same groove width exceeds 11 mm, land portion areas decrease and resistance to tire wear and controlling stability deteriorate.

When the tire circumferential direction spacing of the slanted lateral main grooves is less than 45 mm, land portion areas decrease and resistance to tire wear and controlling stability deteriorate. When the spacing exceeds 52 mm, drainage performance declines.

When the angle formed by the slanted lateral main groove with respect to the tire circumferential direction between the two tire-axial-direction outermost circumferential main grooves falls outside the range described above, drainage performance declines.

In a second aspect of the present invention, the tread has a negative ratio within a range of 45% to 50% at the central area, a negative ratio of 40% to 43% at an outboard-side area which is adjacent to the central area at the outboard side, and a negative ratio of 40% to 45% at an inboard-side area which is adjacent to the central area at the inboard side.

In this manner, when a negative ratio of the tread is within a range of 45% to 50% at the central area, within a range of 40% to 43% at the outboard-side area, and within a range of 40% to 45% at the inboard-side area, balanced improvement of drainage performance in wet conditions, controlling stability and tire wear resistance can be altogether reliably secured.

In a third aspect of the present invention, the pneumatic tire having the first and second aspects is adapted for use as a rear tire of a vehicle.

According to the present aspect, by using for the rear tires of a vehicle a pneumatic tire having the first and second aspects described above, the effects resulting from the working of the present invention can be most effectively demonstrated.

In a fourth aspect of the present invention, the pneumatic tire having the above aspects is adapted for use on a vehicle with wheel alignment settings such that a toe angle is in a toe-in range of from about 0° to about 0.7° and a camber angle is in a negative camber range of from about 0° to about 2°.

According to the present aspect, when the pneumatic tire having the above characteristics is mounted on a vehicle having wheel alignment settings such that a toe angle is in a toe-in range of from about 0° to about 0.7° and a camber angle is in a negative camber range of from about 0° to about 2°, effects resulting from the working of the present invention can be most optimally demonstrated.

DESCRIPTION OF THE PREFERRED EMBODIMENTS

First, we provide following definitions of some particular terms employed in the present specification.

"Inboard side" means the side of the tire which is nearest to the vehicle when the tire is mounted on a wheel and the wheel is mounted on the vehicle.

"Outboard side" means the side of the tire furthest away from the vehicle when the tire is mounted on a wheel and the wheel is mounted on the vehicle.

"Negative ratio" means a value which is obtained by dividing the total non-ground contacting area (grooves and the like) between the lateral edges around the entire circumference of the tread by the gross area of the entire tread between the lateral edges.

An embodiment of a pneumatic tire of the present invention is hereinafter explained with reference to FIG. 1.

Figure 1:
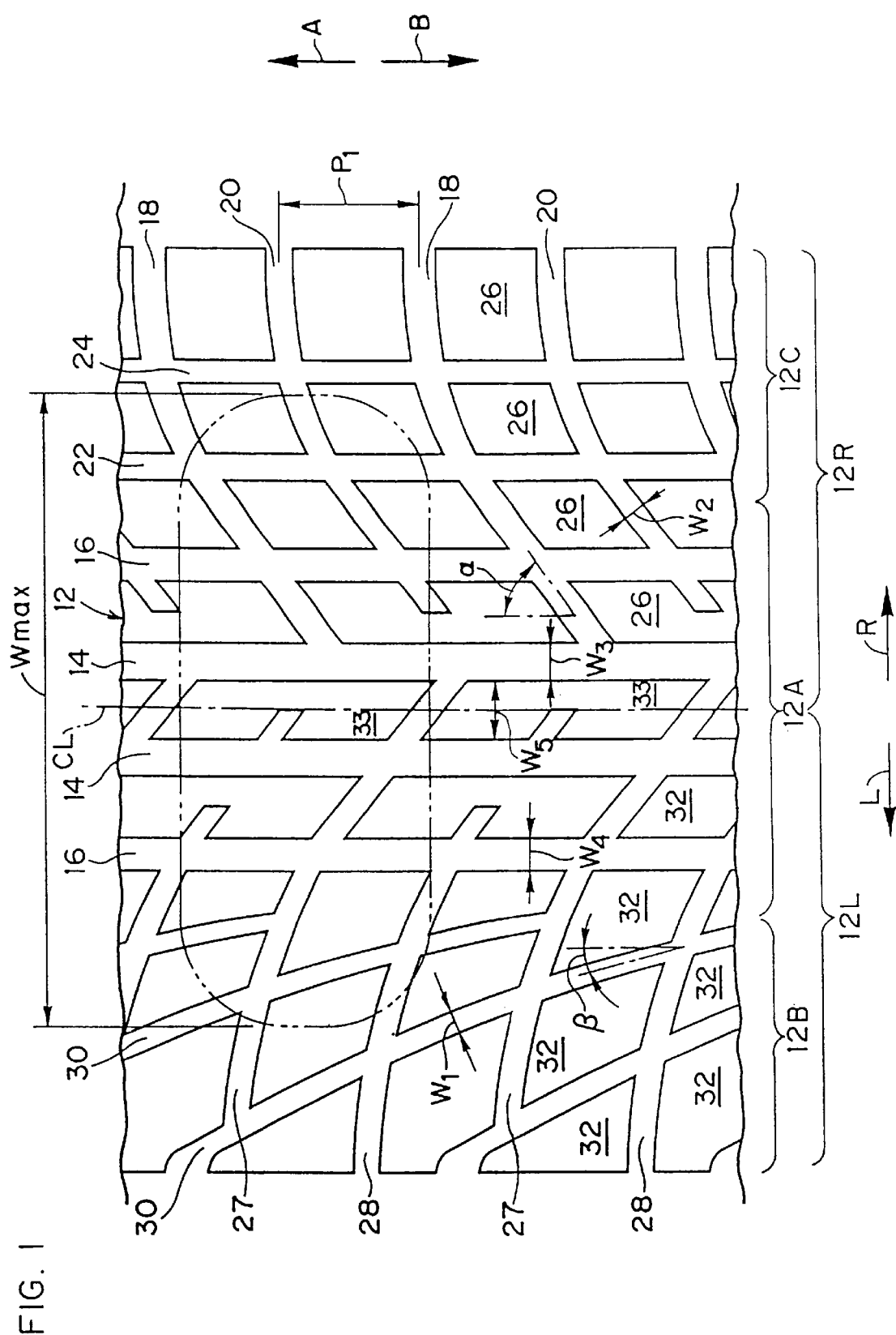
FIG. 1 is a development view of a tread of a pneumatic tire in accordance with a first embodiment of the present invention.

As shown in FIG. 1, a central area 12A is formed in a tread 12 of a pneumatic tire 10 (tire size: 325/45R13) of the present embodiment. The central area 12A corresponds to an area being located within 45% of one-half of a width of the surface contacting portion from the equatorial centerline plane CL along an axial direction of the tire towards the edges of the tread (i.e., the direction of arrow L and the direction of arrow R). First circumferential main grooves 14, which extend along the circumferential direction of the tire at both sides of the tire equatorial plane CL, and second circumferential direction main grooves 16, which extend along the circumferential direction of the tire at both sides of the first circumferential main grooves 14, are formed in the central area 12A of the tread 12.

A two-dotted chain line in FIG. 1 indicates the contour of a ground contact, and Wmax corresponds to a ground contact width.

The pneumatic tire 10 is for a right-hand side rear tire of a vehicle, and rotates in the direction of arrow B when the vehicle advances forward. Consequently, the side of the tread 12 indicated by the direction of arrow L in FIG. 1 corresponds to the outboard side, and the side of the tread 12 indicated by the direction of arrow R corresponds to the inboard side.

It is assumed that the pneumatic tire 10 is fitted for use on a vehicle with wheel alignment settings such that the toe angle is in a toe-in range of from about 0° to about 0.7° and the camber angle is in a negative camber range of from about 0° to about 2°.

An inboard-side area 12R, which corresponds to the area of tread 12 that is at the inboard side of the tire equatorial plane CL (i.e., the part at the side indicated by arrow R in FIG. 1), is divided into groups of land portions 26 aligned laterally between two adjacent slanted lateral main grooves 18, 20. The groups of the laterally-aligned land portions 26 are demarcated by a plurality of inboard side slanted lateral main grooves 18, a plurality of inboard side slanted lateral main grooves 20, a circumferential main groove 22, and a circumferential main groove 24. Hereinafter, the inboard side slanted lateral main grooves 18, 20 may be each referred to simply as "inboard lateral groove 18, 20". The tire equatorial plane CL side end of each inboard lateral groove 18 is slanted in the direction that the tire revolves (i.e., in the direction of arrow B) with respect to the other end of the direction R side. Ends of the inboard lateral grooves 18 open into the first circumferential main groove 14, and other ends of the same open at an edge of the tread in the direction of R. The tire equatorial plane CL side end of each inboard lateral groove 20 is slanted in the direction that the tire revolves (i.e., in the direction of arrow B) with respect to the other end of the direction R side. Ends of the inboard lateral grooves 20 terminate at an intermediate position between the first circumferential main groove 14 and the second circumferential main groove 16, and other ends of the same open at the tread edge in the direction of R. The circumferential main groove 22 and the circumferential main groove 24 extend in the circumferential direction of the tire.

An outboard side area 12L, which corresponds to the area of tread 12 that is at the vehicle outer side of the tire equatorial plane CL (i.e., the part at the side indicated by arrow L in FIG. 1), is divided into groups of land portions 32 aligned laterally between two adjacent slanted lateral main grooves 27, 28. The groups of the laterally-aligned land portions 32 are demarcated by a plurality of outboard side slanted lateral main grooves 27, a plurality of outboard side slanted lateral main grooves 28, and a plurality of outboard side slanted longitudinal main grooves 30. Hereinafter, the outboard side slanted lateral main grooves 27, 28 may be each referred to simply as "outboard lateral groove 18, 20". In addition, the outboard side slanted longitudinal main groove 30 may be referred to simply as "outboard longitudinal groove 30". The tire equatorial plane CL side end of each inboard lateral groove 27 is slanted in the direction that the tire revolves (i.e., in the direction of arrow B)with respect to the other end of the direction L side. Ends of the outboard lateral grooves 27 open into the first circumferential main groove 14, and other ends of the same terminate at a vicinity of the tread edge in the direction of arrow L. The tire equatorial plane CL side end of each outboard lateral groove 28 is slanted in the direction that the tire revolves (i.e., in the direction of arrow B) with respect to the other end of the direction L side. Ends of the outboard lateral grooves 28 terminate at an intermediate position between the first circumferential main groove 14 and the second circumferential main groove 16, while other ends of the same open at the tread edge in the direction of arrow L. The outboard longitudinal grooves 30 are disposed such that an angle formed by each outboard longitudinal groove 30 with respect to the tire circumferential direction is smaller than those of the outboard lateral grooves 27 and the outboard lateral grooves 28.

The tread portion in the vicinity of the tire equatorial plane CL is divided into a plurality of land portions 33 by the pair of first circumferential main grooves 14 and the outboard lateral grooves 27.

Ends of the outboard longitudinal grooves 30 toward the tire equatorial plane CL open into the outboard lateral grooves 27, while other ends of the same open at the tread edge in the direction of arrow It is preferable that an angle β that each outboard longitudinal groove 30 forms with respect to the tire circumferential direction gradually increases within a range of 5° to 30° (i.e., $5° \leq \beta \leq 30°$) in the direction of arrow L from the tire equatorial plane CL to the tread edge, and that a groove width W1 of the outboard longitudinal grooves 30 is within a range of 5 mm to 10 mm. (It is further preferable that the groove width W1 gradually increases toward the tread edge.)

In the present embodiment, the angle β that each outboard longitudinal groove 30 forms with the tire circumferential direction gradually increases in the direction of arrow L from the tire equatorial plane CL to the tread edge from 8° to 30°. Moreover, the groove width W1 gradually increases in the direction of arrow L from the tire equatorial plane CL to the tread edge from 6 mm to 9.5 mm.

It is preferable that the outboard longitudinal grooves 30 are disposed such that land portions disposed between the outboard lateral grooves 27 and the outboard lateral grooves 28 at the tire axial direction outer side of the second circumferential main groove 16 are divided into three to four land portions.

In the present embodiment, the outboard longitudinal grooves 30 are disposed such that land portions disposed between the outboard lateral grooves 27 and the outboard lateral grooves 28 at the axial direction outer side of the second circumferential main groove 16 are divided into three land portions.

It is preferable that an angle α that each inboard lateral groove 18, each inboard lateral groove 20, each outboard lateral groove 27 and each outboard lateral groove 28 forms with respect to the tire circumferential direction is within a range of 20° to 60° between the second circumferential main grooves 16, and at the outboard/inboard side of the second circumferential direction main groove 16 in the area 12L/12R is within a range of 45° to 90° and gradually increases toward the tread edge.

In a particular example of the present embodiment shown in FIG. 1, the angle α that each inboard lateral groove 18, each inboard lateral groove 20, each outboard lateral groove 27 and each outboard lateral groove 28 forms with the tire circumferential direction is 53° between the second circumferential main grooves 16 and gradually increases toward the tread edge from 55° to 85° at the outboard/inboard side of the second circumferential main groove 16 in the area 12L/12R.

It is preferable that a groove width W2 of each inboard lateral groove 18, each inboard lateral groove 20, each outboard lateral groove 27 and each outboard lateral groove 28 is within a range of 8 mm to 11 mm. (It is further preferable that the groove width W2 gradually increases toward the tread edge).

In a particular example of the present embodiment shown in FIG. 1, the groove width W2 of each inboard lateral groove 18, each inboard lateral groove 20, each outboard lateral groove 27 and each outboard lateral groove 28 is 10 mm.

A tire circumferential direction spacing P1 of the inboard lateral grooves 18, the inboard lateral grooves 20, the outboard lateral grooves 27 and the outboard lateral grooves 28 is preferably in a range of 45 mm to 52 mm.

In a particular example of the present embodiment shown in FIG. 1, the tire circumferential direction spacing P1 of the inboard lateral grooves 18, the inboard lateral grooves 20, the outboard lateral grooves 27 and the outboard lateral grooves 28 is 48.8 mm.

It is preferable that a groove width W3 of the first circumferential grooves 14 is within a range of 6% to 10% of the ground contact half width (0.5 Wmax). In a particular example of the present embodiment shown in FIG. 1, the groove width W3 of the first circumferential grooves is 14 9% of the ground contact half width (0.5 Wmax).

It is preferable that a groove width W4 of the second circumferential grooves 16 is within a range of 6% to 10% of the ground contact half width (0.5 Wmax). In a particular example of the present embodiment shown in FIG. 1, the groove width W4 of the second circumferential grooves 16 is 8% of the ground contact half width (0.5 Wmax).

Further, it is preferable that a groove width center line of the second circumferential grooves 16 is disposed at a position within a range of 30% to 40% of the ground contact half width (0.5 Wmax) from the tire equatorial plane CL to outer sides thereof in the tire axial direction.

In a particular example of the present embodiment shown in FIG. 1, the groove width center line of the second circumferential grooves 16 is disposed at a position distanced 36.50% of the ground contact half width (0.5 Wmax) from the tire equatorial plane CL to outer sides thereof in the tire axial direction.

When four or more circumferential main grooves are disposed in the central area 12A, a width W5 of land portions between the two centermost circumferential main grooves (in the present embodiment, a width W5 of land portions 33 between the first circumferential main grooves 14) is preferably within a range of 6% to 10% of the ground contact width Wmax. When an odd number (such as 3) of circumferential main grooves is disposed in the central area 12A, the width of land portions nearest the tire equatorial plane CL (such land portions may be those facing each other with the tire equatorial plane CL therebetween) is preferably within a range of 6% to 10% of the ground contact width Wmax.

A negative ratio of the tread 12 is preferably within a range of 45% to 50% in the central area 12A, within a range of 40% to 43% in the outboard-side area 12B which is adjacent to the central area 12A at the outboard side, and within a range of 40% to 45% in the inboard-side area 12C which is adjacent to the central area 12A at the inboard side.

In a particular example of the present embodiment as shown in FIG. 1, the negative ratio in the central area 12A is 48%, the negative ratio in the outboard-side area 12B is 40%, and the negative ratio in the inboard-side area 12C is 42%.

In a particular example of the present embodiment shown in FIG. 1, all of the first circumferential grooves 14, the second circumferential grooves 16, the inboard lateral grooves 18, the inboard lateral grooves 20, the circumferential main grooves 22, the circumferential main grooves 24, the outboard lateral grooves 27 and the outboard lateral grooves 28 have a groove depth of 6 mm.

Although the patterns shown in FIG. 1 are for a right rear tire, the present invention may also be applied to a left rear tire. Patterns for a left rear wheel are similar to those for the right rear wheel shown in FIG. 1 but formed opposite in hand.

Action of the Present Invention

Next, effects which can be achieved by the aforementioned structures of the pneumatic tire 10 of (the particular example of) the present embodiment will be explained.

(1) In the pneumatic tire 10 of the present embodiment, because two first circumferential grooves 14 and two second circumferential grooves which extend along the tire circumferential direction are disposed in the central area 12A, drainage from the tire central area can be achieved efficiently in spite of the tread 12 being wide.

Further, the groove width W4 of the second circumferential main grooves 16 is set to 8% of the ground contact half width (0.5 Wmax), and the groove width center line of the second circumferential main grooves 16 is disposed at a position distanced 36.50% of the ground contact half width (0.5 Wmax) from the tire equatorial plane CL to the outer sides thereof in the tire axial direction. Therefore, efficiency of drainage from the tire central area is maximized.

(2) When the groove width W4 of the second circumferential main grooves 16 is less than 6% of the ground contact half width (0.5 Wmax), the drainage performance of the tire deteriorates and the permance in wet conditions as a whole declines. On the other hand, when the groove width W4 of the second circumferential main grooves 16 exceeds 10% of the ground contact half width, land portion areas decrease, and resistance to tire wear and controlling stability deteriorate.

(3) When the groove width center line of the second circumferential main grooves 16 is disposed at a position less than 30% of the ground contact half width (0.5 Wmax) from the tire equatorial plane CL to the outer sides thereof in the tire axial direction, the drainage performance of the tire central area declines. On the other hand, when the groove width center line of the second circumferential main grooves 16 is disposed at a position exceeding 40% of the ground contact half width (0.5 Wmax) from the tire equatorial plane CL to the outer sides thereof in the tire axial direction, the drainage performance of the tire central area similarly declines.

(4) Because the negative ratio of the central area 12A is set to 48%, the negative ratio of the outer area 12B is set to 40%, and the negative ratio of the inner area 12C is set to 42%, balanced improvement of drainage performance in wet conditions, controlling stability and tire wear resistance can be altogether reliably secured.

(5) By using the pneumatic tire 10 for the rear wheels of a vehicle, effects resulting from the present invention can be most optimally demonstrated.

(6) Because the pneumatic tire 10 is fitted for use on a vehicle with wheel alignment settings such that the toe angle is in a toe-in range of 0° to 0.7° and the camber angle is in a negative camber range of 0° to 2°, effects resulting from the present invention can be most optimally demonstrated.

(7) When the groove width W5 of the land portions 33 on the tire equatorial plane CL is less than 6% of the ground contact width Wmax, the width of the land portions 33 becomes too narrow, and tire wear resistance and controlling stability decline.

On the other hand, when the groove width W5 of the land portions 33 exceeds 10% of the ground contact width Wmax, the drainage performance of the tire declines.

(8) When the groove width W2 of each of the inboard lateral grooves 18, the inboard lateral grooves 20, the outboard lateral grooves 27 and the outboard lateral grooves 28 is less than 8 mm, the drainage performance of the tire declines.

On the other hand, when the groove width W2 exceeds 11 mm, land portion areas decrease, and tire wear resistance and controlling stability deteriorate.

(9a) When the tire circumferential direction spacing P1 of the inboard lateral grooves 18, the inboard lateral grooves 20, the outboard lateral grooves 27 and the outboard lateral grooves 28 is less than 45 mm, land portion areas decrease, and tire wear resistance and controlling stability deteriorate.

On the other hand, when the spacing P1 exceeds 52 mm, the drainage performance of the tire declines.

(9b) The angle α that each inboard lateral groove 18, each inboard lateral groove 20, each outboard lateral groove 27 and each outboard lateral groove 28 forms with the tire circumferential direction is within a range of 20° to 60° between the second circumferential main grooves 16 and gradually increases toward the tread edge within a range of 45° to 90° at the outboard/inboard side of the second circumferential main groove 16 in the area 12L/12R. When the angle a falls outside these ranges, the drainage performance of the tire declines.

Here, by "ground contact width" is meant the cross-section (width) of a ground contact configuration of a tire when the ground contact configuration is cut by a plane orthogonal to the direction in which the tire advances. Note that the ground contact configuration of the tire is to be measured in a state in which the tire is mounted to a predetermined rim prescribed in the industrial standards of JATMA, TRA, ETRTO and the like applied in the relevant geographical regions, is inflated at a predetermined inner pressure and is subjected to a load prescribed in the same industrial standards. Also included in the category of "ground contact width" as used in the present technology is the cross-section width of a ground contact configuration of a tire cut by a plane orthogonal to the direction in which the tire advances, the ground contact configuration of the tire being measured in a state in which the tire is mounted to a rim that is in actual use but not prescribed in the aforementioned industrial standards due to not being used on public roads (rims for vehicles for racing competitions, for example), and is inflated at the actual-use inner pressure and a predetermined number of passengers are sitting in the vehicle.

Because of the reasons listed in (1) to (9b), performance in wet conditions, wear resistance and controlling stability can be altogether improved with the pneumatic tire 10 of the present embodiment. In particular, when the pneumatic tire 10 is used for the rear wheels of a vehicle, and the wheel alignment is set such that the toe angle is in a toe-in range of 0° to 0.7° and the negative camber angle is in a range of 0° to 2°, these respective performances can be most optimally demonstrated.

Other Embodiments

Although the tire size of the pneumatic tire 10 of the embodiment described above is 325/45R13, the present invention can be applied to tires of other sizes as well. However, the effects resulting from the working of the present invention are particularly well displayed with a wide tire. It is preferable that the pneumatic tire of the present invention has a tread width of 250 mm or greater, and in particular a tread width of 270 mm or greater.

Further, although the pneumatic tire 10 of the embodiment described above is for a rear tire, the pneumatic tire 10 may also be used for a front tire.

EXAMPLES

In order to confirm the effects of the present invention, a conventional tire, as a Comparative Example, and a tire of the present invention, as an Example, were prepared and mounted as the rear wheels of an actual vehicle. Hydroplaning, lap time (best) and lap time (ten laps average) were measured for each tire. Irregular wear properties (heel and toe) and wet grip were examined after a predetermined running distance. Dedicated front wheel tires (different from the tires being tested) were mounted as the front wheels of the vehicle.

The tire of the Example was the pneumatic tire 10 (for rear wheel use) of the preferred embodiment described above.

Figure 2:
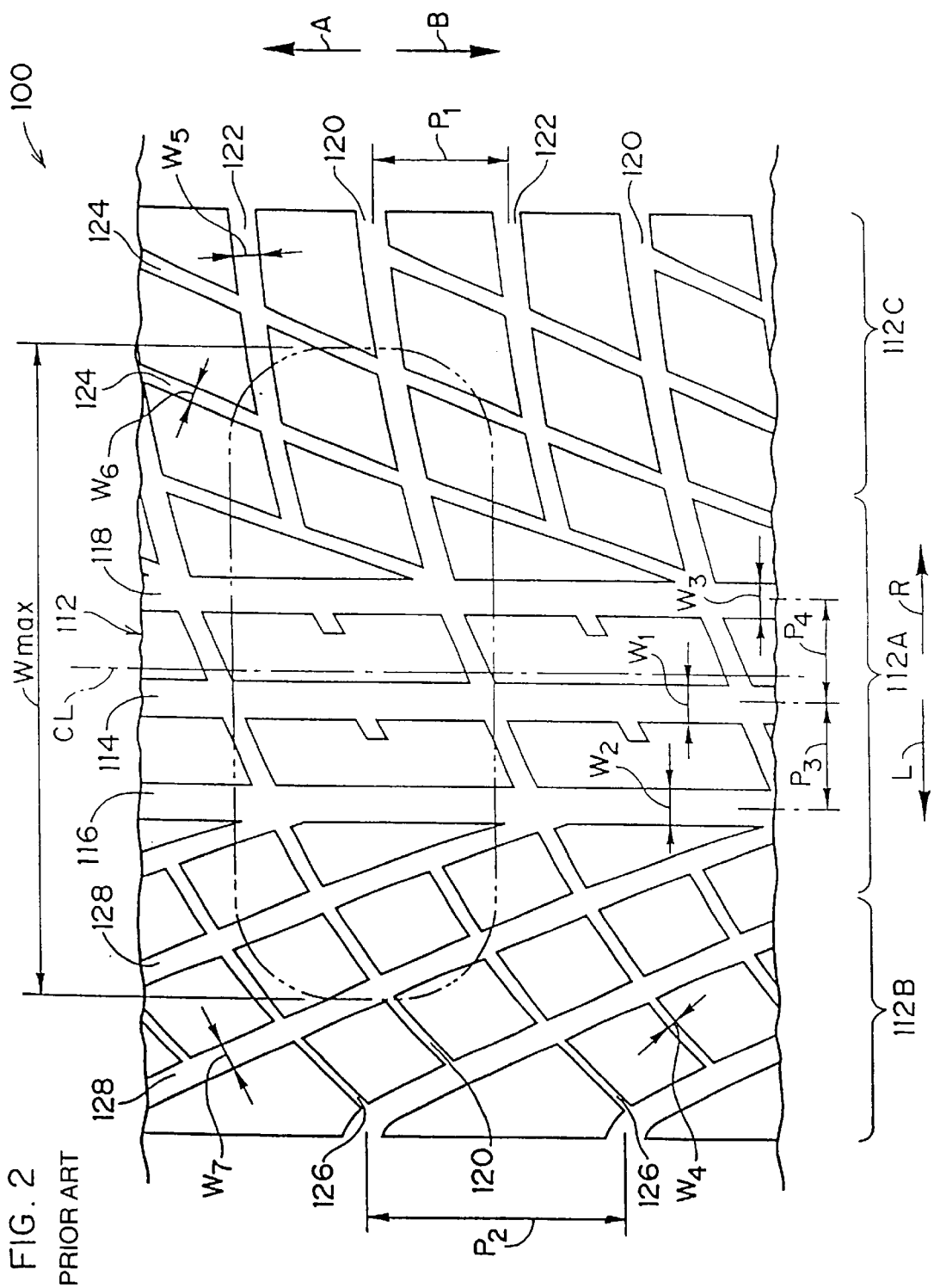
FIG. 2 is a development view of a tread of a conventional pneumatic tire.

The conventional tire was a pneumatic tire 110 with a tread 112 having the pattern shown in FIG. 2.

The conventional pneumatic tire 110 will be described below.

As shown in FIG. 2, in the tread 112 of the conventional pneumatic tire 110, a circumferential main groove 114 and a circumferential main groove 116 extending straight along the tire circumferential direction are formed at the outboard side of a tire equatorial plane CL. A circumferential main groove 118 extending straight along the tire circumferential direction is formed at the inboard side of the tire equatorial plane CL. The tire equatorial plane CL (the width direction center of the tread 12) is disposed between the circumferential main groove 114 and the circumferential main groove 118.

The ground contact width is Wmax (indicated in FIG. 2 by a two-dotted chain line).

The pneumatic tire 110 is used for the right-hand side rear tire of the vehicle, and rotates in the direction of arrow B when the vehicle advances forward. Consequently, the side of the tread 112 indicated by arrow L in FIG. 2 corresponds to the outboard side, and the side of the tread 112 indicated by arrow R corresponds to the inboard side.

At the inboard side of the circumferential main groove 118 of the tread 112, a plurality of (slanted) lateral main grooves 120, a plurality of inboard (slanted) lateral main grooves 122 and a plurality of inboard (slanted) longitudinal main grooves 124 are formed. The lateral main grooves 120 extend from the outboard side to the inboard side and slant such that outboard side portions thereof are positioned further along the tire rotation direction than tire inboard side portions thereof. The inboard lateral main grooves 122 are provided at the inboard side of the circumferential main groove 118 between the lateral main grooves 120, extend from the outboard side to the inboard side and slant such that outboard side portions thereof are positioned further along the tire rotation direction than inboard side portions thereof. The inboard longitudinal main grooves 124 are positioned at an inboard side of the circumferential main groove 118, extend from the outboard side to the inboard side and slant such that outboard side portions thereof are positioned further along the tire rotation direction than inboard side portions thereof, and an angle formed by the outboard longitudinal main groove 124 with respect to the tire circumferential direction is smaller than those of the lateral main grooves 120 and the inboard lateral main grooves 122.

At the outboard side of the circumferential main groove 116 of the tread 112, a plurality of outboard lateral main grooves 126 and a plurality of outboard (slanted) longitudinal main grooves 128 are formed. The outboard lateral main grooves 126 are disposed between the lateral main grooves 120 and are substantially parallel to the lateral main grooves 120. The outboard longitudinal main grooves 128 slant such that inboard side portions thereof are positioned further along the tire rotation direction than outboard side portions thereof.

A groove width W1 of the circumferential main groove 114 is 14 mm, a groove width W2 of the circumferential main groove 116 is 13.5 mm, and a groove width W3 of the circumferential main groove 118 is 13.5 mm.

A groove center spacing P3 of the circumferential main groove 114 and the circumferential main groove 116 is 37.5 mm, and a groove center spacing P4 of the circumferential main groove 114 and the circumferential main groove 118 is 37.5 mm.

A groove width W4 of the lateral main grooves 120 is 2.5 mm at the outboard side end and 5 mm at the inboard side end, and the groove width W4 gradually increases toward the inboard side end.

A groove width W5 of the inboard lateral main grooves 122 is 9 mm at the outboard side end and 8 mm at the inboard side end, and the groove width W5 gradually increases toward the inboard side end.

A spacing P1 of the lateral main grooves 120 and the inner lateral main grooves 122 is 45 mm.

A groove width W6 of the inboard longitudinal main grooves 124 is 5.5 mm, and land portions between the adjacent lateral main grooves 120 is disposed such that they are divided into four land portions.

A groove width W7 of the outboard longitudinal main grooves 128 is 8 mm. Inboard side ends of the outboard longitudinal main grooves 128 open into the circumferential main groove 116 and the tread edge at the outboard side side. The land portions between the adjacent lateral main grooves 120 are disposed such that they are divided into four to five land portions.

A spacing P2 of the outboard longitudinal main grooves 128 is 90 mm.

A groove depth of each of the circumferential main groove 114, the circumferential main groove 116, the circumferential main groove 118, the lateral main grooves 120, the inboard lateral main grooves 122, the inboard longitudinal main grooves 124, the outboard lateral main grooves 126 and the outboard longitudinal main grooves 128 is 6 mm.

The negative ratio of the central area 112A of the tread 112 is 44%, the negative ratio of the outboard-side area 112B is 37%, and the negative ratio of the inboard-side area 112C is 29.5%. The pattern shown in FIG. 2 is for a right rear tire. Patterns for a left rear wheel are similar to those for the right rear wheel shown in FIG. 2 but formed opposite in hand.

Hydroplaning: The tires were run on a wet road surface with a water depth of 2 mm and the speed at which hydroplaning occurred was measured. For evaluation, the result was expressed as an index using the result of the conventional tire as the control which was set at 100. A high index indicates a high speed at which hydroplaning occurred.

Lap time: Lap times of circuits on a wet road surface (a test course) with a water depth of 2 mm were measured. For evaluation, the result was expressed as an index using the result of the conventional tire as the control which was set at 100. A low index indicates a short lap time.

Irregular wear: The degree of heel and toe wear generated in tire land portions was measured after circuits on the wet road surface (the test course) with a water depth of 2 mm. For evaluation, the result was expressed as an index using the result of the conventional tire as the control which was set at 100. A low index indicates low irregular wear.

Wet grip: An evaluation of the grip was based on the test driver's impressions of how the grip felt at the time circuits on the wet road surface with water depth of 2 mm (the test course) were made. For evaluation, the result was expressed as an index using the result of the conventional tire as the control which was set at 100. A high index indicates a good wet grip.

At the rear wheels of the test vehicle, the wheel alignment was set such that the toe angle (toe-in range) was 0° and the negative camber angle was 0°.

TABLE 1

|  | Comparative Example | Example |
| --- | --- | --- |
| Hydroplaning | 100 | 120 |
| Lap Time (Best) | 100 | 97 |
| Lap Time (Average) | 100 | 85 |
| Irregular wear | 100 | 95 |
| Wet Grip | 100 | 110 |

As the test results indicate, the Example pneumatic tire of the present invention was superior than the conventional tire in every category.

As described above, the pneumatic tire of the present invention having the aforementioned structure exhibits excellent effects in that high wet condition drainage performance, controlling stability and tire wear resistance can be altogether improved without sacrificing other tire properties, even when the tread is wide.

Furthermore, the pneumatic tire of the present invention, due to the structure described above, exhibits excellent effects in that balanced improvement of high wet condition drainage performance, controlling stability and tire wear resistance can be altogether reliably secured.

What is claimed is:

1. A pneumatic tire for mounting to a wheel and supporting a vehicle above a surface, the tire comprising a tread having opposite edges and a surface contacting portion, and an equatorial centerline plane, the tread including:
   (a) at least three circumferential main grooves extending through a central area in the surface contacting portion, the central area being located within 45% of one-half of a width of the surface contacting portion from the equatorial centerline plane along an axial direction of the tire towards the edges of the tread, each circumferential main groove having a groove width from 6% to 10% of one-half of said width of the surface contacting portion, with groove center lines of two tire-axial-direction outermost circumferential main grooves being located a distance from 30% to 40% of one-half of said width from the equatorial centerline plane towards each of the edges of the tread;
   (b) a plurality of slanted lateral main grooves, each having opposite ends, one end of each slanted lateral main groove opening into a circumferential main groove and the other end of each slanted lateral main groove opening into one of the edges of the tread, each slanted lateral main groove slanting such that said one end thereof is positioned further along a direction of rotation of the tire relative to said other end of that slanted lateral main groove when the tire is rolling forwardly as used on a vehicle, each slanted lateral main groove having a groove width in a range of 8 mm to 11 mm, a tire circumferential direction spacing from one another in a range of 45 mm to 52 mm, each slanted lateral main groove having an angle with respect to the tire circumferential direction, between the two tire-axial-direction outermost circumferential main grooves, being within a range of 20° to 60°, and an angle with respect to the tire circumferential direction, outside the two tire-axial-direction outermost circumferential main grooves, being within a range of 45° to 90°; and
   (c) a plurality of land portions defined by the adjacent circumferential main grooves, with some land portions nearer to the equatorial centerline plane than any of the other land portions, said some land portions having a tire axial direction width of 6% to 10% of the surface contact width,
       wherein the tread pattern at the inboard side of the tire equatorial plane is asymmetric with respect to the tread pattern at the outboard side of the tire equatorial plane.

2. The pneumatic tire according to claim 1, wherein the tread has a negative ratio within a range of 45% to 50% at the central area, a negative ratio of 40% to 43% at an outboard-side area which is adjacent to the central area at the outboard side, and a negative ratio of 40% to 45% at an inboard-side area which is adjacent to the central area at the inboard side.

3. The pneumatic tire according to claim 1, wherein at the outboard-side area of the tread, outboard side slanted longitudinal main grooves are formed, ends thereof at the tire equatorial plane side open into the slanted lateral main grooves and other ends thereof open into the tread edge at the outboard side.

4. The pneumatic tire according to claim 3, wherein the outboard side slanted longitudinal main grooves have an angle of a range of 5° to 30° with respect to the tire circumferential direction, the angle gradually increasing from the tire equatorial plane to the tread edge at the outboard side.

5. The pneumatic tire according to claim 3, wherein a groove width of the outboard side slanted longitudinal main grooves is within a range of 5 mm to 10 mm, and the groove width gradually expands or stays constant toward the tread edge at the outboard side.

6. The pneumatic tire according to claim 3, wherein the outboard side slanted longitudinal main grooves are disposed in the outboard-side area such that land portions formed between the adjacent outboard side slanted lateral main grooves are divided into 3 to 4 land portions.

7. The pneumatic tire according to claim 1, wherein the groove width of at least some of the slanted lateral main grooves gradually increases toward the tread edge at the corresponding tread edge.

8. A pneumatic tire for mounting to a wheel and supporting a vehicle above a surface, the tire comprising a tread having opposite edges and a surface contacting portion, and an equatorial centerline plane, the tread including:
- (a) at least three circumferential main grooves extending through a central area in the surface contacting portion, the central area being located within 45% of one-half of a width of the surface contacting portion from the equatorial centerline plane along an axial direction of the tire towards the edges of the tread, with groove center lines of two tire-axial-direction outermost circumferential main grooves being located a distance from 30% to 40% of one-half of said width from the equatorial centerline plane towards each of the edges of the tread, and each circumferential main groove extending through the central area having a groove width from 6% to 10% of one-half of said width of the surface contacting portion;
- (b) a plurality of slanted lateral main grooves, each having opposite ends, one end of each slanted lateral main groove opening into a circumferential main groove and the other end of each slanted lateral main groove opening into one of the edges of the tread, each slanted lateral main groove slanting such that said one end thereof is positioned further along a direction of rotation of the tire relative to said other end of that slanted lateral main groove when the tire is rolling forwardly as used on a vehicle, each slanted lateral main groove having an angle of a range of 20° to 60° with respect to the tire circumferential direction between the two tire-axial-direction outermost circumferential main grooves, and an angle of a range of 45° to 90° with respect to the tire circumferential direction outside the two tire-axial-direction outermost circumferential main grooves;
- (c) outboard side slanted longitudinal main grooves formed at an outboard-side area adjacent to the central area at the outboard side, each outboard side slanted longitudinal main groove having opposite ends, one end thereof being nearer the tire equatorial center line than the other end, which said one end opens into a slanted lateral main groove and said other end thereof opens into an edge of the tread at an outer side of the tire; and
- (d) a plurality of land portions, with some land portions nearer to the equatorial centerline plane than any of the other land portions, said some land portions having a tire axial direction width of 6% to 10% of the surface contact width,
    wherein the tread pattern at the inboard side of the tire equatorial plane is asymmetric with respect to the tread pattern at the outboard side of the tire equatorial plane.

9. The pneumatic tire according to claim 8, wherein the slanted lateral main grooves have a groove width within a range of 8 mm to 11 mm, and a tire circumferential direction spacing within a range of 45 mm to 52 mm from one another.

10. The pneumatic tire according to claim 8, wherein a negative ratio of the tread is within a range of 45% to 50% at the central area, within a range of 40% to 43% at an outboard-side area which is adjacent to the central area at the outboard side, and a negative ratio of 40% to 45% at an inboard-side area which is adjacent to the central area at the inboard side.

11. The pneumatic tire according to claim 8, wherein the outboard side slanted longitudinal main grooves have an angle of a range of 5° to 30° with respect to the tire circumferential direction, the angle gradually increasing from the tire equatorial plane to the tread edge at the outboard side.

12. The pneumatic tire according to claim 8, wherein a groove width of the outboard side slanted longitudinal main grooves is within a range of 5 mm to 10 mm, and the groove width gradually expands or stays constant toward the tread edge at the outboard side.

13. The pneumatic tire according to claim 8, wherein the outboard side slanted longitudinal main grooves are disposed in the outer area such that land portions formed between the adjacent outboard side slanted lateral main grooves are divided into 3 to 4 land portions.

14. The pneumatic tire according to claim 8, wherein the groove width of at least some of the slanted lateral main grooves gradually increases toward the corresponding tread edge.

15. A pneumatic tire for mounting to a wheel and supporting a vehicle above a surface, the tire comprising a tread having opposite edges and a surface contacting portion, and an equatorial centerline plane, the tread including:
- (a) at least three circumferential main grooves, the circumferential main grooves extending through a central area in the surface contacting portion, the central area being located within 45% of one-half of a width of the surface contacting portion from the equatorial centerline plane along an axial direction of the tire towards the edges of the tread;
- (b) a plurality of slanted lateral main grooves, each having opposite ends, one end of each slanted lateral main groove opening into a circumferential main groove and the other end of each slanted lateral main groove opening into one of the edges of the tread, each slanted lateral main groove slanting such that said one end thereof is positioned further along a direction of rotation of the tire relative to said other end of that slanted lateral main groove when the tire is rolling forwardly as used on a vehicle, each slanted lateral main groove having an angle of a range of 20° to 60° with respect to the tire circumferential direction between the two tire-axial-direction outermost circumferential main grooves, in the surface contacting portion, and an angle of a range of 45° to 90° with respect to the tire circumferential direction, outside the two tire-axial-direction outermost circumferential main grooves; and
- (c) outboard side slanted longitudinal main grooves formed at an outboard-side area adjacent to the central area at the outboard side, each outboard side slanted longitudinal main groove having opposite ends, one end thereof being nearer the tire equatorial center line than the other end, which said one end opens into a slanted lateral main groove and said other end thereof opens into an edge of the tread at an outer side of the tire, the outboard side slanted longitudinal main grooves having an angle of a range of 5° to 30° with respect to the tire circumferential direction which gradually increases from the tire equatorial centerline plane to the tread edge at the outboard side;
- (d) a negative ratio within a range of 45% to 50% at the central area, a negative ratio of 40% to 43% at the outboard-side area, and a negative ratio of 40% to 45% at an inboard-side area which is adjacent to the central area at the inboard side.

16. The pneumatic tire according to claim 15, wherein groove center lines of two tire-axial-direction outermost circumferential main grooves are located a distance from 30% to 40% of one-half of said width from the equatorial centerline plane towards each of the edges of the tread, and each circumferential main groove extending through the central area having a groove width from 6% to 10% of one-half of said width of the surface contacting portion, and the tread including a plurality of land portions defined by the adjacent circumferential main grooves, with some land portions nearer to the equatorial centerline plane than any of the other land portions, said some land portions having a tire axial direction width of 6% to 10% of the surface contact width.

* * * * *